United States Patent
Nakamura et al.

(10) Patent No.: US 12,142,915 B2
(45) Date of Patent: Nov. 12, 2024

(54) FLYWHEEL, FLYWHEEL DESIGNING METHOD, AND FLYWHEEL POWER STORAGE SYSTEM

(71) Applicant: NEXFI TECHNOLOGY INC., Suita (JP)

(72) Inventors: Takashi Nakamura, Suita (JP); Satoshi Tanimoto, Suita (JP)

(73) Assignee: NexFi Technology Inc., Osaka (JP)

( * ) Notice: Subject to any disclaimer, the term of this patent is extended or adjusted under 35 U.S.C. 154(b) by 147 days.

(21) Appl. No.: 17/764,695

(22) PCT Filed: Oct. 2, 2020

(86) PCT No.: PCT/JP2020/037583
§ 371 (c)(1),
(2) Date: Mar. 29, 2022

(87) PCT Pub. No.: WO2021/070749
PCT Pub. Date: Apr. 15, 2021

(65) Prior Publication Data
US 2022/0329102 A1   Oct. 13, 2022

Related U.S. Application Data

(60) Provisional application No. 62/913,295, filed on Oct. 10, 2019.

(51) Int. Cl.
*H02J 15/00* (2006.01)
*F03G 3/08* (2006.01)
*H02K 7/02* (2006.01)

(52) U.S. Cl.
CPC .............. *H02J 15/007* (2020.01); *F03G 3/08* (2013.01); *H02K 7/025* (2013.01)

(58) Field of Classification Search
CPC ...................................................... H02J 15/007
See application file for complete search history.

(56) References Cited

U.S. PATENT DOCUMENTS 4,370,899 A * 2/1983 Swartout ............... F16F 15/305
474/196
4,860,611 A * 8/1989 Flanagan ................. F16C 15/00
74/572.11

(Continued)

FOREIGN PATENT DOCUMENTS

JP    S59-006644 U    5/1980
JP    2000-055134 A   2/2000

(Continued)

OTHER PUBLICATIONS

Office Action dated Aug. 20, 2024 issued in the corresponding Japanese Patent Application No. 2021-103254 with the English machine translation thereof.

*Primary Examiner* — Vicky A Johnson
(74) *Attorney, Agent, or Firm* — Carrier, Schende & Associates P.C.; Fulchand P. Shende; Joseph P. Carrier

(57) ABSTRACT

The present invention provides a flywheel having a high energy density, a designing method which facilitates the designing of the flywheel, and an energy storage system which can achieve both an increase in storage energy and a reduction in weight by adopting the flywheel. A flywheel A includes: a low-density disk 10 having a low average density; and a high-density outer edge section 11 which is provided on the outer circumference of the low-density disk 10, and has an average density higher than that of the low-density disk 10.

12 Claims, 12 Drawing Sheets

(56) References Cited

U.S. PATENT DOCUMENTS

| | | | | |
|---|---|---|---|---|
| 6,211,589 B1* | 4/2001 | Ahlstrom | ............... | H02K 7/025 |
| | | | | 74/572.11 |
| 6,247,382 B1 | 6/2001 | Umeki et al. | | |
| 7,263,912 B1* | 9/2007 | Gabrys | ................ | F16F 15/315 |
| | | | | 464/74 |
| 10,050,491 B2* | 8/2018 | Groves | ................ | F16F 15/305 |
| 2012/0151791 A1 | 6/2012 | Atkins | | |
| 2019/0196408 A1* | 6/2019 | Haemmerli | .......... | G04B 18/006 |

FOREIGN PATENT DOCUMENTS

| | | | |
|---|---|---|---|
| JP | 2012-522190 A | 9/2012 | |
| JP | 2013-106493 A | 5/2013 | |
| JP | 2014-190503 A | 10/2014 | |
| JP | 2017-78444 A | 4/2017 | |
| JP | 6323641 B2 | 5/2018 | |

* cited by examiner

FIG. 12

| ρ₁/ρ₂ (=s) \ R_v/R_o (=f) | 0 | 0.1 | 0.2 | 0.3 | 0.4 | 0.5 | 0.6 | 0.7 | 0.8 | 0.9 | 0.95 | 0.99 | 0.999 |
|---|---|---|---|---|---|---|---|---|---|---|---|---|---|
| 0.001 | 1.00 | 1.01 | 1.04 | 1.09 | 1.16 | 1.25 | 1.36 | 1.49 | 1.64 | 1.81 | 1.89 | 1.93 | 1.67 |
| 0.01 | 1.00 | 1.01 | 1.04 | 1.09 | 1.16 | 1.25 | 1.35 | 1.48 | 1.62 | 1.77 | 1.82 | 1.65 | 1.16 |
| 0.05 | 1.00 | 1.01 | 1.04 | 1.09 | 1.15 | 1.23 | 1.33 | 1.44 | 1.56 | 1.63 | 1.59 | 1.27 | 1.04 |
| 0.1 | 1.00 | 1.01 | 1.04 | 1.08 | 1.14 | 1.22 | 1.31 | 1.40 | 1.49 | 1.51 | 1.42 | 1.15 | 1.02 |
| 0.2 | 1.00 | 1.01 | 1.03 | 1.07 | 1.12 | 1.19 | 1.26 | 1.33 | 1.38 | 1.35 | 1.25 | 1.07 | 1.01 |
| 0.3 | 1.00 | 1.01 | 1.03 | 1.06 | 1.11 | 1.16 | 1.22 | 1.27 | 1.29 | 1.25 | 1.17 | 1.04 | 1.00 |
| 0.4 | 1.00 | 1.01 | 1.02 | 1.05 | 1.09 | 1.13 | 1.18 | 1.21 | 1.22 | 1.18 | 1.12 | 1.03 | 1.00 |
| 0.5 | 1.00 | 1.00 | 1.02 | 1.04 | 1.07 | 1.11 | 1.14 | 1.17 | 1.17 | 1.13 | 1.08 | 1.02 | 1.00 |
| 0.6 | 1.00 | 1.00 | 1.02 | 1.03 | 1.06 | 1.08 | 1.11 | 1.12 | 1.12 | 1.09 | 1.06 | 1.01 | 1.00 |
| 0.7 | 1.00 | 1.00 | 1.01 | 1.03 | 1.04 | 1.06 | 1.08 | 1.09 | 1.09 | 1.06 | 1.04 | 1.01 | 1.00 |
| 0.8 | 1.00 | 1.00 | 1.01 | 1.02 | 1.03 | 1.04 | 1.05 | 1.06 | 1.05 | 1.04 | 1.02 | 1.00 | 1.00 |
| 0.9 | 1.00 | 1.00 | 1.00 | 1.01 | 1.01 | 1.02 | 1.02 | 1.03 | 1.02 | 1.02 | 1.01 | 1.00 | 1.00 |
| 1 | 1.00 | 1.00 | 1.00 | 1.00 | 1.00 | 1.00 | 1.00 | 1.00 | 1.00 | 1.00 | 1.00 | 1.00 | 1.00 |

FLYWHEEL, FLYWHEEL DESIGNING METHOD, AND FLYWHEEL POWER STORAGE SYSTEM

TECHNICAL FIELD

The present invention relates to a flywheel, a flywheel designing method, and a flywheel energy storage system.

BACKGROUND ART

Hitherto, there has been known a flywheel energy storage system that stores electrical energy as kinetic energy by rotationally moving a flywheel (refer to, for example, Patent Literature 1 below).

Typically, as a flywheel of a flywheel power energy system, there has been used a flywheel composed of a disk made of one type of material and formed such that the entire disk exhibits a uniform density, as in Patent Literature 1 below, or a flywheel composed of a disk having the outer circumferential edge thereof provided with an outer edge section made of a material having a density lower than that of the disk.

CITATION LIST

Patent Literature

Patent Literature 1: Japanese Patent No. 6323641

SUMMARY OF INVENTION

Technical Problem

However, the conventional flywheel configuration described above poses a problem in that a mass energy density cannot be sufficiently obtained when a flywheel is to be rotated at the specified angular velocity.

In view of the above, an object of the present invention is to provide a flywheel that has a higher energy density, a designing method that facilitates the designing of the flywheel, and an energy storage system that can achieve both an increase in storage energy and a reduction in weight by adopting such a flywheel.

Solution to Problem

A flywheel of a flywheel energy storage system according to the present invention is composed of a low-density disk having a relatively low average density, and a high-density outer edge section which is provided on the outer circumference of the low-density disk and has an average density higher than that of the low-density disk.

The flywheel according to the present invention is composed of the low-density disk and the high-density outer edge section, so that when rotating with the same volume at the same angular velocity, the flywheel can achieve a higher mass energy density, as compared with a conventional flywheel (composed of a disk made of one type of material and formed such that the entire disk has a uniform density, or a disk having the outer circumferential edge thereof provided with an outer edge section formed of a material having a density lower than that of the disk).

Further, in the flywheel according to the present invention, in the case where an improvement in mass energy density by 10% or more is to be obtained over a conventional flywheel having a disk made of one type of material and formed such that the entire disk exhibits a uniform density, if the average density of the low-density disk is denoted by $\rho_i$ and the radius thereof is denoted by $R_i$, and the average density of the high-density outer edge section is denoted by $\rho_o$ and the radius thereof is denoted by $R_o$, then $R_i/R_o$ should be 0.4 or more and below 1, and $\rho_i/\rho_o$ should be 0.6 or less.

Further, in the flywheel according to the present invention, in the case where an improvement in mass energy density by 50% or more is to be obtained over a conventional flywheel having a disk made of one type of material and formed such that the entire disk has a uniform density, if the average density of the low-density disk is denoted by $\rho_i$ and the radius thereof is denoted by $R_i$, and the average density of the high-density outer edge section is denoted by $\rho_o$ and the radius thereof is denoted by $R_o$, then $R_i/R_o$ should be 0.8 or more and below 1, and $\rho_i/\rho_o$ should be 0.1 or less.

Further, a flywheel designing method for designing the flywheel according to the present invention optimizes $R_i/R_o$ and $\rho_i/\rho_o$ so as to increase a value Z defined by expression (1) below, wherein the average density of the low-density disk is denoted by $\rho_i$ and the radius thereof is denoted by $R_i$, and the average density of the high-density outer edge section is denoted by $\rho_o$ and the radius thereof is denoted by $R_o$.

[Math. 1]

$$Z = \frac{\left(\frac{R_i}{R_o}\right)^4\left(\frac{\rho_i}{\rho_o} - 1\right) + 1}{\left(\frac{R_i}{R_o}\right)^2\left(\frac{\rho_i}{\rho_o} - 1\right) + 1} \quad (1)$$

Expression (1) indicates an energy density ratio between the flywheel according to the present invention and a conventional flywheel composed of a disk made of one type of material and formed such that the entire disk has a uniform density (hereinafter referred to simply as "the conventional flywheel").

More specifically, expression (1) is determined as described below. From the relationship among a mass M, an inertia moment J, and energy E of the conventional flywheel, the energy density of the conventional flywheel is represented by expression (2), where t, r and ω are thickness, radius variable and angular velocity of the flywheel, respectively.

[Math. 2]

$$M = \pi R_o^2 t \rho_i \quad (2)$$

$$J \equiv \int_0^{R_0} r^2 dM = \frac{1}{2}\pi t \rho_i R_0^4$$

$$E \equiv \frac{1}{2}J\omega^2 = \frac{1}{4}\pi t \rho_i R_o^4 \omega^2$$

$$\frac{E}{M} = \frac{1}{4}R_o^2\omega^2$$

Meanwhile, from the relationship among a mass $M_i$, an inertia moment $J_i$, and energy $E_i$ of the low-density disk of the flywheel according to the present invention, $$M_i = \pi R_i^2 t \rho_i$$

$$J_i = \frac{1}{2}\pi t \rho_i R_i^4$$

$$E_i = \frac{1}{2}J_i\omega^2 = \frac{1}{4}\pi t \rho_i R_i^4 \omega^2 \quad [\text{Math. 3}]$$

and the relationship among a mass $M_o$, an inertia moment $J_o$, and energy $E_o$ of the low-density disk of the flywheel according to the present invention, and $$M_o = \pi(R_o^2 - R_i^2) t \rho_o$$

$$J_o = \int_{R_i}^{R_o} r^2 dM = \frac{1}{2}\pi t \rho_o (R_o^4 - R_i^4)$$

$$E_o = \frac{1}{2} J_o \omega^2 = \frac{1}{4}\pi t \rho_o (R_o^4 - R_i^4) \omega^2 \quad \text{[Math. 4]}$$

the energy density of the flywheel according to the present invention is represented by expression (3).

[Math. 5]

$$\frac{E_i + E_o}{M_i + M_o} = \frac{1}{4} \frac{\rho_i R_i^4 + \rho_o (R_o^4 - R_j^4)}{\rho_i R_i^2 + \rho_o (R_o^2 - R_i^2)} \omega^2 \quad (3)$$

Then, from expression (2) and expression (3), expression (4) representing the energy density ratio between the flywheel according to the present invention and the conventional flywheel can be obtained. From expression (4), it is obvious that the energy density ratio depends only on $R_i/R_o$ and $\rho_i/\rho_o$ and is irrelevant to a rotational angular velocity $\omega$.

[Math. 6]

$$\frac{\frac{E_i + E_o}{M_i + M_o}}{\frac{E}{M}} = \frac{\frac{1}{4} \frac{\rho_i R_i^4 + \rho_0 (R_0^4 - R_j^4)}{\rho_i R_i^2 + \rho_0 (R_o^2 - R_i^2)} \omega^2}{\frac{1}{4} R_o^2 \omega^2} \quad (4)$$

$$= \frac{\rho_i R_i^4 + \rho_o (R_o^4 - R_j^4)}{\rho_i R_o^2 R_i^2 + \rho_0 R_o^2 (R_o^2 - R_i^2)}$$

$$= \frac{\left(\frac{R_i}{R_o}\right)^4 \left(\frac{\rho_i}{\rho_0} - 1\right) + 1}{\left(\frac{R_i}{R_o}\right)^2 \left(\frac{\rho_i}{\rho_0} - 1\right) + 1}$$

Expression (1) is based on expression (4). Therefore, the value Z of the energy density ratio can be determined from expression (1). Thus, a desired energy density ratio can be easily calculated by using expression (1).

As is obvious from the above, in the flywheel designing method according to the present invention, the $R_i/R_o$ and the $\rho_i/\rho_o$ are preferably determined such that the value Z is maximized.

Further, in the flywheel designing method according to the present invention, preferably, a matrix table in which the value Z is recorded at the intersection of the variable $R_i/R_o$ and the variable $\rho_i/\rho_o$ is used to visually search for a region where the value Z increases. In the matrix table, as shown in FIG. 12, for example, the values of $R_i/R_o$ are placed in a horizontal direction, the values of $\rho_i/\rho_o$ are placed in a vertical direction, and the value Z of the energy density ratio calculated by expression (1) is recorded at a position where the value of $R_i/R_o$ and the value of $\rho_i/\rho_o$ intersect with each other.

Using the matrix table makes it possible to present a plurality of combination candidates of $R_i/R_o$ and $\rho_i/\rho_o$ that achieve a target energy density ratio (improvement ratio). Consequently, the $R_i/R_o$ and the $\rho_i/\rho_o$ can be determined extremely easily and quickly.

More specifically, in the case where an improvement of the mass energy density by 10% or more than that of the conventional flywheel is to be obtained, it can be easily determined by using the matrix table given in FIG. 12 that $R_i/R_o$ should be 0.4 or more and below 1, and $\rho_i/\rho_o$ should be 0.6 or less, and in the case where an improvement of the mass energy density by 50% or more than that of the conventional flywheel is to be obtained, it can be easily determined by using the matrix table that $R_i/R_o$ should be 0.8 or more and below 1, and $\rho_i/\rho_o$ should be 0.1 or less.

Further, in the flywheel according to the present invention, the low-density disk is preferably formed of a material that is any one of a carbon fiber plastic, a silicon carbide fiber reinforced plastic, and a light metal, or formed by selectively combining a plurality of the above materials.

Further, in the flywheel according to the present invention, the high-density outer edge section is preferably formed of a material that is any one of a heavy metal, a carbon fiber plastic with a heavy metal embedded therein, and a silicon carbide fiber reinforced plastic with a heavy metal embedded therein.

At this time, the heavy metal embedded in the carbon fiber plastic or the heavy metal embedded in the silicon carbide fiber reinforced plastic may be powder, a wire, or a fragment arranged in circumferentially equiangular symmetry.

Of the above, the fragment of a heavy metal arranged in the circumferential equiangular symmetry is preferably shaped to protrude toward the rotation axis of the high-density outer edge section.

Further, a flywheel energy storage system according to the present invention includes: a generator motor, a rotating shaft provided coaxially with an input/output shaft included in the generator motor, and a flywheel provided on the rotating shaft, wherein the flywheel is composed of a low-density disk having a relatively low average density and a high-density outer edge section which is closely circumscribed to an outer circumference of the low-density disk and has a relatively higher average density than that of the low-density disk.

The flywheel energy storage system according to the present invention includes a flywheel having a high mass energy density. Thus, by using the flywheel with a reduced weight, the weight of the entire flywheel power storage system can be reduced, and a highly efficient flywheel power storage system can be provided.

BRIEF DESCRIPTION OF DRAWINGS

FIG. 12 is a diagram illustrating an example of a matrix table.

DESCRIPTION OF EMBODIMENTS

Figure 1:
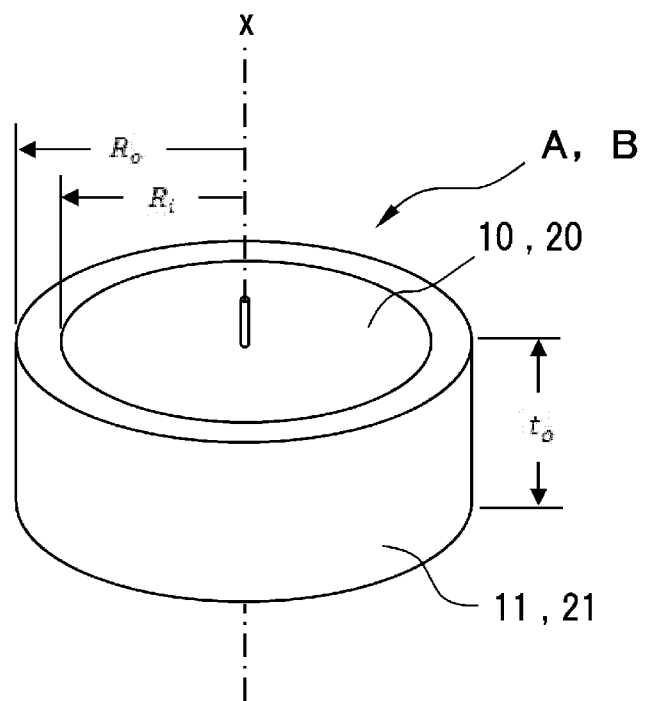
FIG. 1 is a perspective view illustrating flywheels of a first and a second embodiments.

The embodiments of the present invention will be described with reference to the accompanying drawings. Flywheels A and B of a first and a second embodiments will be described with reference to FIG. 1. The flywheel A of the first embodiment includes a columnar low-density disk 10 and a cylindrical high-density outer edge section 11.

The low-density disk 10 and the high-density outer edge section 11 are formed to have the same thickness dimension $t_o$, and the high-density outer edge section 11 is provided integrally with the outer circumference of the low-density disk 10. The high-density outer edge section 11 and the low-density disk 10 share the same rotation axis x as the centers thereof.

In the flywheel A of the first embodiment, the low-density disk 10 is formed using, as the material thereof, a carbon fiber reinforced plastic (CFRP) having a radius of $R_i$=12 cm and an average mass density of $\rho_i$=1.6 g/cm$^3$, and the high-density outer edge section 11 is formed using, as the material thereof, a high-melting-point metal, such as tungsten, having a radius of $R_o$=15 cm and an average mass density of $\rho_o$=19.25 g/cm$^3$. A thickness dimension $t_o$ is 20 cm.

The low-density disk 10 may be formed using, as the material thereof, a silicon carbide fiber reinforced plastic (SiCFRP) other than a carbon fiber reinforced plastic (CFRP).

According to the flywheel A of the first embodiment, the value Z of the energy density ratio determined by expression (1) below is 1.51, thus improving the energy density by 51% as compared with that of the conventional flywheel.

[Math. 7]

$$Z = \frac{\left(\frac{R_i}{R_o}\right)^4\left(\frac{\rho_i}{\rho_o} - 1\right) + 1}{\left(\frac{R_i}{R_o}\right)^2\left(\frac{\rho_i}{\rho_o} - 1\right) + 1} \quad (1)$$

The flywheel B of the second embodiment includes a columnar low-density disk 20 and a cylindrical high-density outer edge section 21, as with the flywheel A of the first embodiment.

The low-density disk 20 is formed using, as the material thereof, a carbon fiber reinforced plastic (CFRP) having a radius of $R_i$=13 cm and an average mass density of $\rho_i$=1.6 g/cm$^3$, and the high-density outer edge section 21 is formed using, as the material thereof, high-hardness steel, such as a WC—Co cermet alloy, having a radius of $R_o$=15 cm and an average mass density of $\rho_o$=14.2 g/cm$^3$. A thickness dimension $t_o$ is 20 cm.

According to the flywheel B of the second embodiment, the value Z of the energy density ratio determined by expression (1) is 1.49, thus improving the energy density by 49% as compared with that of the conventional flywheel.

Figure 2:
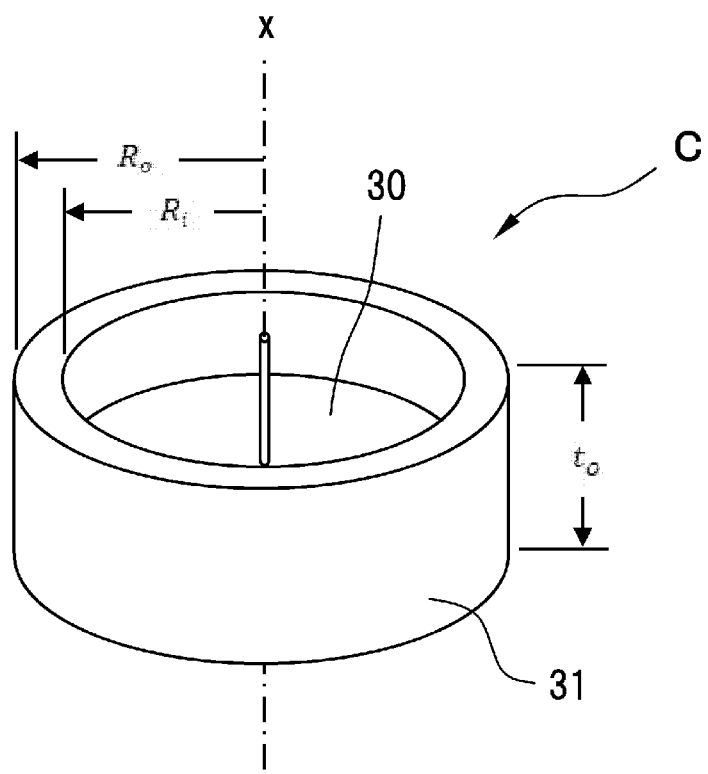
FIG. 2 is a perspective view illustrating a flywheel of a third embodiment.
Figure 3:
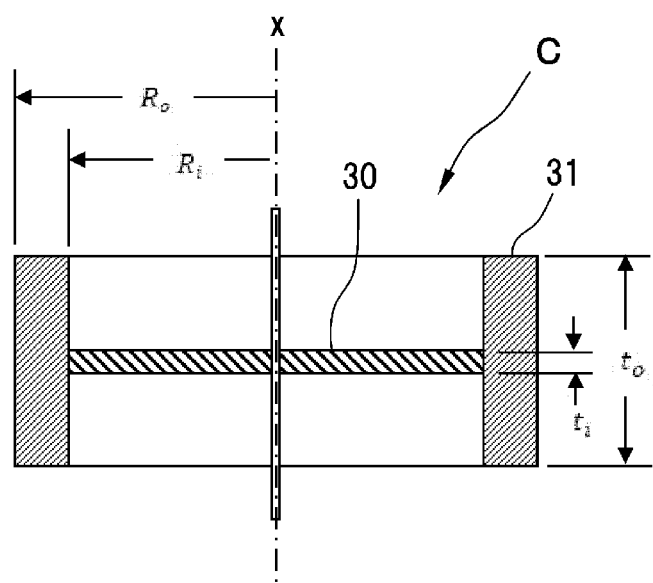
FIG. 3 is an explanatory sectional view of the flywheel of the third embodiment.

A flywheel C of a third embodiment will now be described. The flywheel C of the third embodiment includes a disk-shaped low-density disk 30 and a cylindrical high-density outer edge section 31 as illustrated in FIG. 2 and FIG. 3. A thickness dimension $t_i$ of the low-density disk 30 is smaller than a thickness dimension $t_o$ of the high-density outer edge section 31.

The low-density disk 30 is formed using titanium as a material having a thickness dimension of $t_i$=3 cm, a radius of $R_i$=13.5 cm and an average mass density of $\rho_i$=4.5 g/cm$^3$, and the high-density outer edge section 31 is formed using a high-melting-point metal, such as tungsten, as a material having the thickness dimension of $t_o$=20 cm, the radius of $R_o$=15 cm and the average mass density of $\rho_o$=19.25 g/cm$^3$.

According to the flywheel C of the third embodiment, the value Z of the energy density ratio determined by expression (1) is 1.68, thus improving the energy density by 68% as compared with that of the conventional flywheel.

Figure 4:
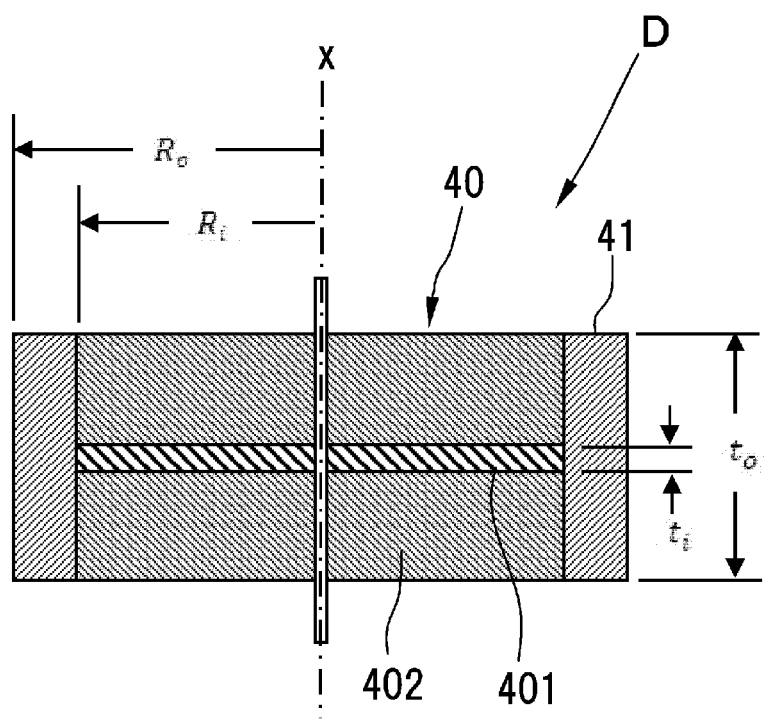
FIG. 4 is an explanatory sectional view of a flywheel of a fourth embodiment.

A flywheel D of a fourth embodiment will now be described. As illustrated in FIG. 4, the flywheel D of the fourth embodiment includes a disk-shaped low-density disk 40 and a cylindrical high-density outer edge section 41. The low-density disk 40 is composed of a titanium disk 401 and a pair of carbon fiber reinforced plastic disks 402 sandwiching the titanium disk 401. The high-density outer edge section 41 is provided on the outer circumference of the low-density disk 40.

The titanium disk 401 has a thickness dimension of $t_{i1}$=3 cm, a radius of $R_i$=13 cm and an average mass density of $\rho_{i1}$=4.5 g/cm$^3$, and each of the carbon fiber reinforced plastic disks 402 has a thickness dimension of $t_{i2}$=8.5 cm, a radius of $R_i$=13 cm and an average mass density of $\rho_{i2}$=1.6 g/cm$^3$.

The average mass density of the low-density disk 40 composed of the titanium disk 401 and the pair of carbon fiber reinforced plastic disks 402 is $\rho_i$=4.5×(3/20)+1.6×(17/20)=1.6 g/cm$^3$.

The high-density outer edge section 41 is formed using a high-melting-point metal, such as tungsten, as a material having a thickness dimension of $t_o$=20 cm, the radius of $R_o$=15 cm and an average mass density of $\rho_o$=19.25 g/cm$^3$.

According to the flywheel D of the fourth embodiment, the value Z of the energy density ratio determined by expression (1) is 1.51, thus improving the energy density by 51% as compared with that of the conventional flywheel.

Figure 5:
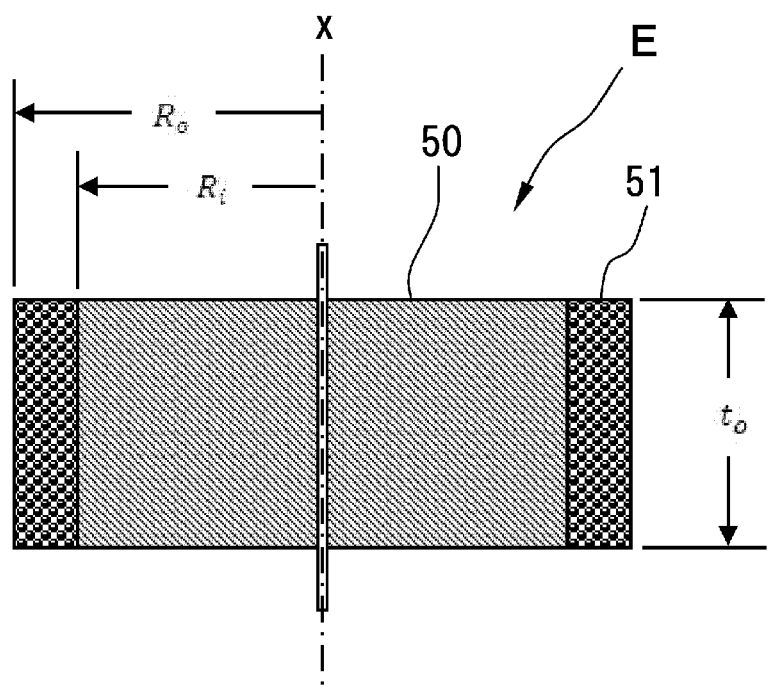
FIG. 5 is an explanatory sectional view of a flywheel of a fifth embodiment.

A flywheel E of a fifth embodiment will now be described. As illustrated in FIG. 5, the flywheel E of the fifth embodiment includes a columnar low-density disk 50 and a cylindrical high-density outer edge section 51, as with the flywheel A of the first embodiment. The low-density disk 50 and the high-density outer edge section 51 have the same thickness dimension $t_o$ of 20 cm.

The low-density disk 50 is formed using, as the material thereof, a carbon fiber reinforced plastic (CFRP) having a radius of $R_i$=13 cm and an average mass density of $\rho_i$=1.6 g/cm$^3$, and the high-density outer edge section 51 is formed using, as the material thereof, a metallic fiber reinforced plastic (MFRP) having a radius of $R_o$=15 cm and an average mass density of $\rho_o$=13.82 g/cm$^3$. As the metallic fiber reinforced plastic (MFRP), one reinforced by winding a W fine wire bundle having a diameter of 5 μm in the circumferential direction is adopted.

According to the flywheel E of the fifth embodiment, the value Z of the energy density ratio determined by expression (1) is 1.49, thus improving the energy density by 49% as compared with that of the conventional flywheel.

Flywheels F, G and H of a sixth, a seventh and an eighth embodiments will now be described with reference to FIG. 6.

The flywheel F of the sixth embodiment includes a hollow low-density disk 60 and a cylindrical high-density outer edge section 61.

The low-density disk 60 is composed of two disks 601 opposing each other in an axial direction with an air gap 602 therebetween. Each of the disks 601 constituting the low-density disk 60 is formed using, as the material thereof, a carbon fiber reinforced plastic (CFRP) having a thickness dimension of $t_i=2$ cm, a radius of $R_i=13.5$ cm and an average mass density of $\rho_{i2}=1.6$ g/cm$^3$.

The average mass density of the low-density disk 60 composed of the two disks 601 is $\rho_i=1.6\times((2+2)/20)=0.32$ g/cm$^3$.

The high-density outer edge section 61 is formed using, as the material thereof, a superhard metallic microfiber reinforced plastic (MFRP) having a radius $R_o$ of 15 cm and an average mass density $\rho_o$ of 5.84 g/cm$^3$. A thickness dimension is $t_o=20$ cm. As the superhard metallic microfiber reinforced plastic (MFRP), one reinforced by winding a piano fine wire bundle having a diameter of 10 μm in the circumferential direction is adopted.

According to the flywheel F of the sixth embodiment, the value Z of the energy density ratio determined by expression (1) is 1.62, thus improving the energy density by 62% as compared with that of the conventional flywheel.

Figure 6:
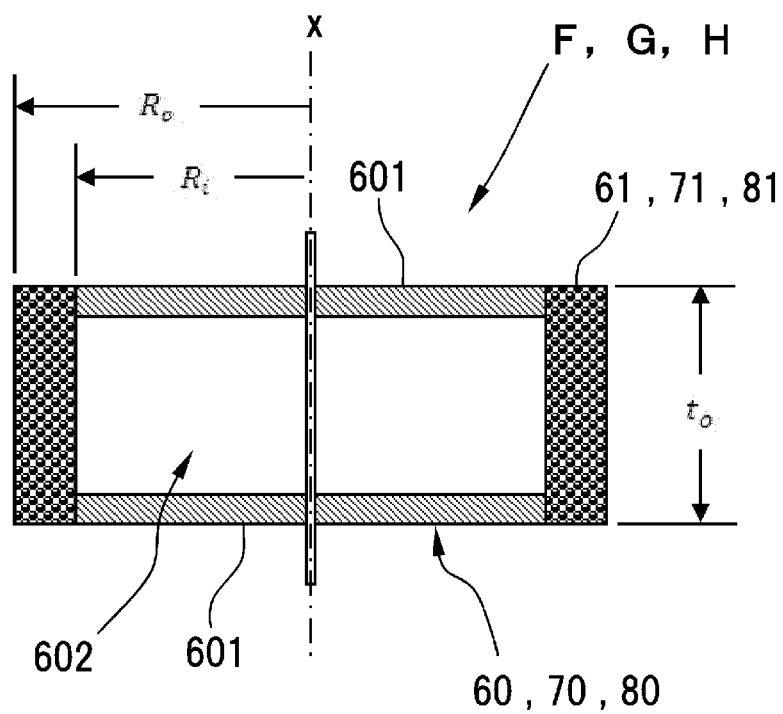
FIG. 6 is an explanatory sectional view of flywheels of a sixth, a seventh, and an eighth embodiments.

The positions of the two disks 601 of the low-density disks 60 in the flywheel F of the sixth embodiment are not limited to the positions illustrated in FIG. 6 as long as the two disks 601 are accommodated inside the high-density outer edge section 61. For example, although not illustrated, the distance between the two disks 601 may be shorter than that illustrated in FIG. 6. Further, in the sixth embodiment, an example has been shown in which the two disks 601, each having the thickness dimension $t_i$ of 2 cm, are used, but other than this, the low density disk 60 may be formed by using three or more disks having the thickness dimension $t_i$ that is smaller.

The flywheel G of the seventh embodiment is composed of a low-density disk 70 being made of the same material and having the same structure as those of the sixth embodiment, and a high-density outer edge section 71 which has the same shape and dimensions as those of the sixth embodiment but is made of a different material.

Since the low-density disk 70 is the same as the low-density disk 60 of the sixth embodiment, the average mass density is $\rho_i=1.6\times((2+2)/20)=0.32$ g/cm$^3$.

The high-density outer edge section 71 of the seventh embodiment is composed of plastic (CMFRP resin) reinforced by carbon fiber (CF) and superhard metallic microfiber (MF). The CMFRP resin adopted for the high-density outer edge section 71 is reinforced by winding a composite bundle composed of a W fine wire (wire) and a carbon fiber wire (both having a diameter of approximately 5 to 10 μm) in the circumferential direction, and the average mass density thereof is $\rho_o=6.84$ g/cm$^3$.

According to the flywheel G of the seventh embodiment, the value Z of the energy density ratio determined by expression (1) is 1.64, thus improving the energy density by 64% as compared with that of the conventional flywheel. As the CMFRP resin adopted for the high-density outer edge section 71, a superhard metallic fine wire like a piano wire may be used in place of the W fine wire.

The flywheel H of the eighth embodiment is composed of a low-density disk 80 being made of the same material and having the same structure as those of the sixth embodiment, and a high-density outer edge section 81 which has the same shape and dimensions as those of the sixth embodiment but is made of a different material.

Since the low-density disk 80 is the same as the low-density disk 60 of the sixth embodiment, the average mass density is $\rho_i=1.6\times((2+2)/20)=0.32$ g/cm$^3$.

The high-density outer edge section 81 of the eighth embodiment is formed of a CFRP:M material, which is a solid made of plastic (epoxy resin) having superhard metal M powder dispersed and being reinforced by carbon fiber (CF).

The superhard metal M powder is W powder (density $\rho_{o2}=19.25$ g/cm$^3$, particle size 0.7 μm, and filling factor $V_{f2}=0.25$). The plastic is an epoxy resin (density $\rho_{o3}=1.15$ g/cm$^3$). The carbon fiber has a density $\rho_{o1}=1.80$ g/cm$^3$, a wire diameter of 5 to 10 μm, and a filling factor $V_{f1}=0.45$, and is reinforced by winding the carbon fiber bundle in the circumferential direction. In this configuration, the average mass density of the high-density outer edge section 81 is $\rho_o=6.84$ g/cm$^3$.

According to the flywheel H of the eighth embodiment, the value Z of the energy density ratio determined by expression (1) is 1.62, thus improving the energy density by 62% as compared with that of the conventional flywheel. Regarding the CFRP:M material adopted for the high-density outer edge section 81, the fine powder of other metals may be used in place of the W powder.

Figure 7:
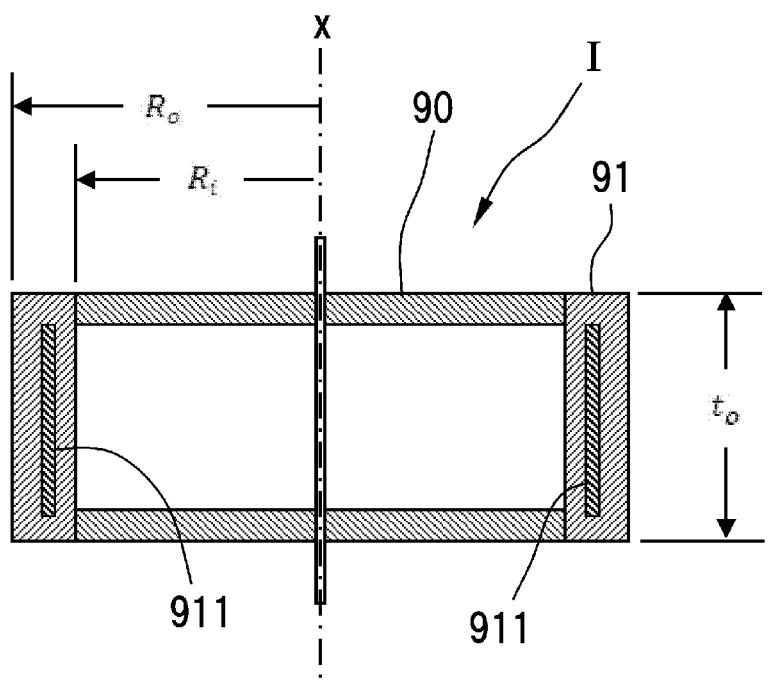
FIG. 7 is an explanatory sectional view of a flywheel of a ninth embodiment.
Figure 8:
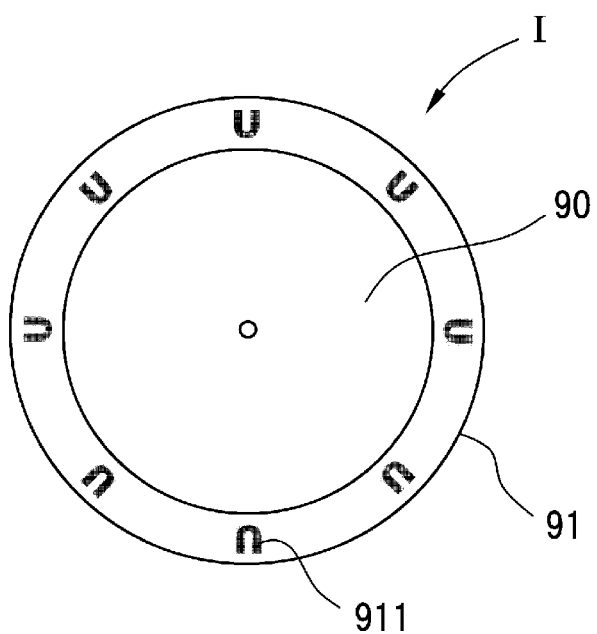
FIG. 8 is a diagram schematically illustrating the configuration of a high-density outer edge section of the flywheel of the ninth embodiment.

A description will now be given of a flywheel I of a ninth embodiment. As illustrated in FIG. 7 and FIG. 8, the flywheel I of the ninth embodiment is composed of a low-density disk 90 being made of the same material and having the same structure as those of the sixth embodiment, and a high-density outer edge section 91 having the same shape and the same dimensions as those of the sixth embodiment.

Since the low-density disk 90 is the same as the low-density disk 60 of the sixth embodiment, the average mass density is $\rho_i=1.6\times((2+2)/20)=0.32$ g/cm$^3$.

The high-density outer edge section 91 in the flywheel I of the ninth embodiment is formed in a cylindrical shape by carbon fiber reinforced plastic (CFRP), in which a plurality of metal fragments 911 arranged in circumferential equiangular symmetry at predetermined intervals from each other in the circumferential direction are embedded.

All the metal fragments 911 have the same shape, are formed of a heavy metal, and are provided with tips in a protruding shape, which are directed toward a rotation axis so as to protrude toward the rotation axis.

In each of the metal fragments 911, the average mass density of cemented carbide is $\rho_{o1}=14.2$ g/cm$^3$ and the filling factor is $V_{f1}=0.25$, and the average mass density of epoxy resin, which is plastic, is $\rho_{o2}=1.15$ g/cm$^3$. Therefore, the average mass density of the high-density outer edge section 91 having this configuration is $\rho_o=4.41$ g/cm$^3$.

According to the flywheel I of the ninth embodiment, the value Z of the energy density ratio determined by expression (1) is 1.57, thus improving the energy density by 57% as compared with that of the conventional flywheel.

Figure 9:
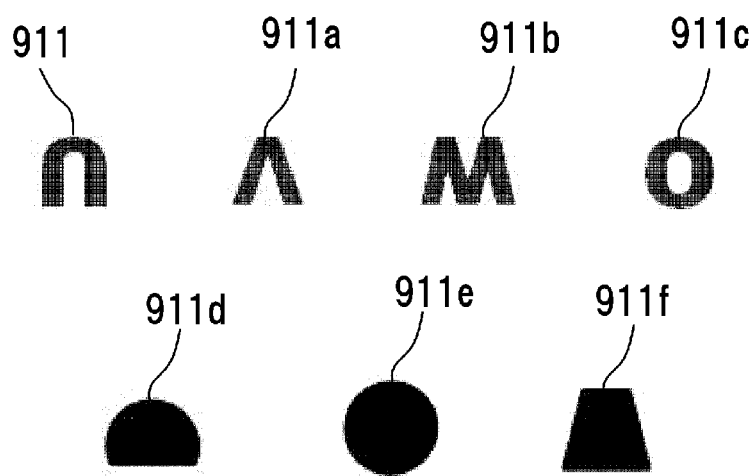
FIG. 9 is a diagram illustrating the shapes of the metal fragments in the flywheel of the ninth embodiment.

As illustrated in FIG. 9, the shapes of the metal fragments 911 can be selectively used from among various shapes (metal fragments 911 and 911a to 911f in FIG. 9). At this time, metal fragments having the same shape are used for the high-density outer edge section 91, and the tips of the protruding shapes (the ends on the upper side in the drawing) are to be directed toward the rotation axis regardless of which shape of the metal fragments 911 and 911a to 911f is adopted.

Figure 10:
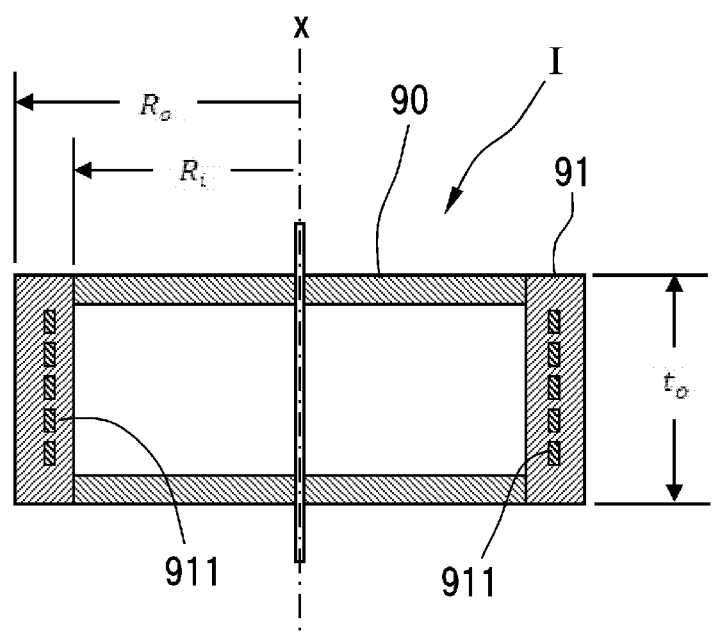
FIG. 10 is an explanatory sectional view illustrating a modification example of a part of the flywheel of the ninth embodiment.

Further, other than the metal fragments 911 having the shape with the length along the rotation axis as illustrated in FIG. 7, a plurality of the metal fragments 911 having shorter length dimensions may be provided and arranged at intervals in the direction along the rotation axis as illustrated in FIG. 10.

Figure 11:
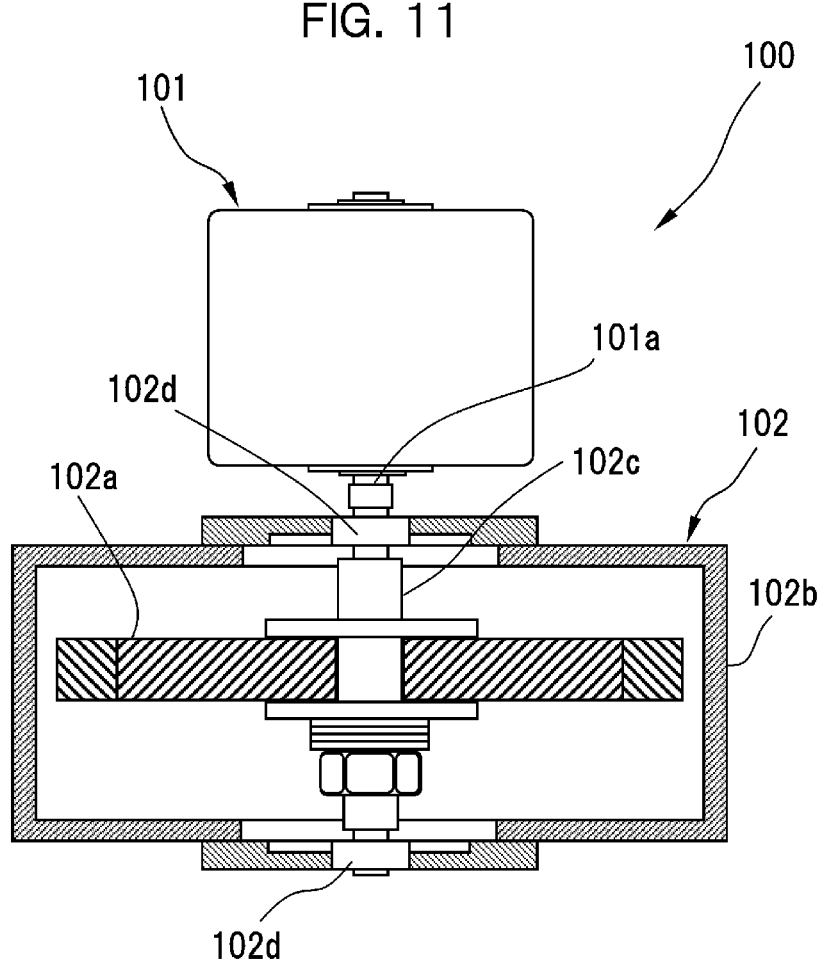
FIG. 11 is an explanatory sectional view illustrating the configuration of a flywheel power energy system.

The flywheels shown in the embodiments described above can be suitably adopted for flywheel energy storage systems. More specifically, as illustrated in FIG. 11, a flywheel energy storage system 100 includes a generator motor 101 and a flywheel unit 102 as illustrated in FIG. 11.

The flywheel unit 102 includes a flywheel 102a and a chassis 102b accommodating the flywheel 102a. The flywheel 102a is provided on a rotating shaft 102c and rotates integrally with the rotating shaft 102c.

The rotating shaft 102c is connected to an input/output shaft 101a of the generator motor 101. The rotating shaft 102c of the flywheel unit 102 is rotatably supported by a pair of bearings 102d provided on the chassis 102b.

For the flywheel 102a, a flywheel having the configuration shown in each of the embodiments described above (any one of the flywheels A, B, C, D, E, F, G, H, and I) is adopted. An increase in storage energy can be easily achieved by increasing the thickness dimension or the diameter of the flywheel 102a.

Due to the configuration shown in each of the embodiments described above, the flywheel 102a exhibits a higher energy density and is lighter as compared with the conventional flywheel. Consequently, the flywheel energy storage system 100 can be configured to be lightweight.

Further, the reduced weight of the flywheel 102a makes it possible to improve the energy density at a system level as compared with a conventional flywheel energy storage system.

INDUSTRIAL APPLICABILITY

According to the present invention, a flywheel capable of obtaining a high mass energy density, and a flywheel energy storage system that stores electrical energy as kinetic energy by rotationally moving the flywheel are obtained, and an apparatus suited for storing and using surplus energy can be provided.

DESCRIPTION OF REFERENCE NUMERALS

100 . . . flywheel energy storage system
101 . . . generator motor
101a . . . input/output shaft
102c . . . rotating shaft
A, B, C, D, E, F, G, H, I, 102a . . . flywheel
10, 20, 30, 40, 50, 60, 70, 80, 90 . . . low-density disk
11, 21, 31, 41, 51, 61, 71, 81, 91 . . . high-density outer edge section
911, 911a, 911b, 911c, 911d, 911e, 911f . . . fragment

The invention claimed is:

1. A flywheel of a flywheel energy storage system comprising:
a low-density disk having a relatively lower average density that is composed of a single member; and a high-density outer edge section which has an average density higher than that of the low-density disk and an inner surface of the high-density outer edge section is in contact with an outer surface of the low-density disk over entire circumference in a circumferential direction,
wherein, in a case where an average density of the low-density disk is denoted by $\rho_i$ and a radius thereof is denoted by $R_i$, and an average density of the high-density outer edge section is denoted by $\rho_o$ and a radius thereof is denoted by $R_o$, $R_i/R_o$ is 0.4 or more and below 1, and $\rho_i/\rho_o$ is 0.6 or less.

2. The flywheel according to claim 1,
wherein, the $R_i/R_o$ is 0.8 or more and below 1, and the $\rho_i/\rho_o$ is 0.1 or less.

3. A flywheel designing method for designing the flywheel according to claim 1,
wherein, the $R_i/R_o$ and the $\rho_i/\rho_o$ are optimized so as to increase a value Z defined by expression (1) below:

[Math. 1]

$$Z = \frac{\left(\frac{R_i}{R_o}\right)^4\left(\frac{\rho_i}{\rho_o} - 1\right) + 1}{\left(\frac{R_i}{R_o}\right)^2\left(\frac{\rho_i}{\rho_o} - 1\right) + 1} \quad (1)$$

4. The flywheel designing method according to claim 3, wherein the $R_i/R_o$ and the $\rho_i/\rho_o$ are determined such that the value Z is maximized.

5. The flywheel designing method according to claim 3, wherein a matrix table in which the value Z is recorded at an intersection of a variable $R_i/R_o$ and a variable $\rho_i/\rho_o$ is used to visually search for a region where the value Z increases.

6. The flywheel according to claim 1,
wherein the low-density disk is formed of a material that is any one of a carbon fiber plastic, a silicon carbide fiber reinforced plastic, and a light metal, or formed by selectively combining a plurality of the materials.

7. The flywheel according to claim 1,
wherein the high-density outer edge section is formed of a material that is any one of a heavy metal, a carbon fiber plastic with a heavy metal embedded therein, and a silicon carbide fiber reinforced plastic with a heavy metal embedded therein.

8. The flywheel according to claim 7,
wherein the heavy metal used for the high-density outer edge section is ultrahigh-strength steel or a high-melting-point metal, or a high-melting-point metal alloy.

9. The flywheel according to claim 7,
wherein the heavy metal embedded in the carbon fiber plastic or the heavy metal embedded in the silicon carbide fiber reinforced plastic is powder or a wire, or a fragment arranged in circumferentially equiangular symmetry.

10. The flywheel according to claim 9,
wherein the heavy metal fragment arranged in the circumferentially equiangular symmetry is shaped to protrude toward a rotation axis of the high-density outer edge section.

11. A flywheel energy storage system comprising: a generator motor; a rotating shaft provided coaxially with an input/output shaft included in the generator motor; and a flywheel provided on the rotating shaft,
wherein the flywheel is composed of a low-density disk having a relatively low average density that is composed of a single member and a high-density outer edge section which has a relatively higher average density than that of the low-density disk and an inner surface of the high-density outer edge section is in contact with an outer surface of the low-density disk over entire circumference in a circumferential direction.

12. A flywheel of a flywheel energy storage system comprising:
a low-density disk having a relatively lower average density that is composed of a single member; and a high-density outer edge section which has an average density higher than that of the low-density disk and an inner surface of the high-density outer edge section is in contact with an outer surface of the low-density disk over entire circumference in a circumferential direction,
wherein, the flywheel is free to rotate continuously in one direction.

\* \* \* \* \*